US008832512B2

(12) United States Patent
Czysz et al.

(10) Patent No.: US 8,832,512 B2
(45) Date of Patent: Sep. 9, 2014

(54) LOW POWER COMPRESSION OF INCOMPATIBLE TEST CUBES

(75) Inventors: Dariusz Czysz, Poznan (PL); Grzegorz Mrugalski, Swarzedz (PL); Nilanjan Mukherjee, Wilsonville, OR (US); Janusz Rajski, West Linn, OR (US); Przemyslaw Szczerbicki, Wielkopolski (PL); Jerzy Tyszer, Poznan (PL)

(73) Assignee: Mentor Graphics Corporation, Wilsonville, OR (US)

( * ) Notice: Subject to any disclaimer, the term of this patent is extended or adjusted under 35 U.S.C. 154(b) by 502 days.

(21) Appl. No.: 13/049,829

(22) Filed: Mar. 16, 2011

(65) Prior Publication Data

US 2011/0231721 A1 Sep. 22, 2011

Related U.S. Application Data

(60) Provisional application No. 61/314,566, filed on Mar. 16, 2010.

(51) Int. Cl.
*G06F 11/00* (2006.01)

(52) U.S. Cl.
USPC .......................................................... 714/738

(58) Field of Classification Search
USPC ..................................... 714/738, 729, E11.02
See application file for complete search history.

(56) References Cited

U.S. PATENT DOCUMENTS 7,236,633 B1 * 6/2007 Lewis et al. .................. 382/233
2004/0221215 A1 * 11/2004 Kumaki ........................ 714/738
2005/0268194 A1 * 12/2005 Wang et al. .................. 714/733
2008/0195346 A1 * 8/2008 Lin et al. ....................... 702/119
2008/0235544 A1 * 9/2008 Lai et al. ........................ 714/729
2008/0288838 A1 * 11/2008 Anzou ........................... 714/726
2010/0192030 A1 * 7/2010 Kapur et al. .................. 714/726
2012/0030377 A1 * 2/2012 Inoue ............................ 709/247

OTHER PUBLICATIONS

X. Liu and Q. Xu, "On simultaneous shift- and capture power reduction in linear decompressor-based test compression test environment," Proc. ITC, paper 9.3, 2009.*

Q. Xu, D. Hu, and D. Xiang, "Pattern-directed circuit virtual partitioning for test power reduction," Proc. ITC, paper 25.2, 2007.

C. Zoellin, H.-J. Wunderlich, N. Maeding, and J. Leenstra, "BIST power reduction using scan-chain disable in the Cell processor," Proc. ITC, 2006, paper 32.3.

Y. Zorian, "A distributed BIST control scheme for complex VLSI devices," Proc. VTS, pp. 4-9, 1993.

Y. Bonhomme P. Girard L. Guiller' C. Landrault S. Pravossoudovitch A Gated Clock Scheme for Low Power Scan Testing of Logic ICs or Embedded Cores Laboratoire d 'Informatique de Robotique et de Microe'lectronique de Montpellier, Universite' Montpellier II / CNRS.

(Continued)

*Primary Examiner* — Ajay Bhatia
*Assistant Examiner* — Thien D Nguyen
(74) *Attorney, Agent, or Firm* — Klarquist Sparkman, LLP

(57) ABSTRACT

Disclosed are representative embodiments of methods, apparatus, and systems for power aware test applications involving deterministic clustering of test cubes with conflicts. Embodiments of the disclosed technology can be used to generate low toggling parent patterns to reduce power consumption during testing an integrated circuit. The power consumption may be further reduced by generating low toggling control patterns.

12 Claims, 4 Drawing Sheets

(56) References Cited

OTHER PUBLICATIONS

Xiaoqing Wen 1, Kohei Miyase 1, Seiji Kajihara 1, Tatsuya Suzuki 1, Yuta Yamato 1, Patrick Girard 2 Yuji Ohsumi 3, and Laung-Terng Wang 4 A Novel Scheme to Reduce Power Supply Noise for High-Quality At-Speed Scan Testing Paper 25.1 International Test Conference.

Seongmoon Wang Wenlong Wei A Technique to Reduce Peak Current and Average Power Dissipation in Scan Designs by Limited Capture IEEE 7 pages.

Tsung-Chu Huang Kuen- Jong Lee A Token Scan Architecture for Low Power Testing * Department of Electrical Engineering National Cheng Kung University Tainan, Taiwan 70101, R.O.C.

Bonhomme, P. Girard, L. Guiller, C. Landrault, and S. Pravossoudovitch, "Efficient scan chain design for power minimization during scan testing under routing constraint," Proc. ITC, pp. 488-493, 2003.

K. M. Butler, J. Saxena, T. Fryars, G. Hetherington, A. Jain, and J. Lewis, "Minimizing power consumption in scan testing: pattern generation and DFT techniques," Proc. ITC, pp. 355-364, 2004.

A. Chandra and K. Chakrabarty, "Low-power scan testing and test data compression for system-on-a-chip," IEEE Trans. CAD, vol. 21, pp. 597-604, May 2002.

A. Chandra and K. Chakrabarty, "A unified approach to reduce SOC test data volume, scan power and testing time," IEEE Trans. CAD, vol. 22, pp. 352-362, Mar. 2003.

M. Chiu and J. C.-M. Li, "Jump scan: a DFT technique for low power testing," Proc. VTS, pp. 277-282, 2005.

K.Y. Cho, S. Mitra, and E.J. McCluskey, "California scan architecture for high quality and low power testing," Proc. ITC, paper 25.3, 2007.

R. M. Chou, K. K. Saluja, and V. D. Agrawal, "Scheduling tests of VLSI systems under power constraints," IEEE Trans. VLSI, vol. 5, pp. 175-185, Jun. 1997.

D. Czysz, M. Kassab, X. Lin, G. Mrugalski, J. Rajski, J. Tyszer, "Low power scan operation in test data compression environment," IEEE Trans. CAD, vol. 28, pp. 1742-1755, Nov. 2009.

D. Czysz, G. Mrugalski, N. Mukherjee, J. Rajski, J. Tyszer, "Compression based on deterministic test vector clustering of incompatible test cubes," Proc. ITC, paper 9.2, 2009.

D. Czysz, G. Mrugalski, J. Rajski, J. Tyszer, "Low power test data application in EDT environment through decompressor freeze", IEEE Trans. CAD, vol. 27, pp. 1278-1290, Jul. 2008.

V.P. Dabholkar, S. Chakravarty, I. Pomeranz, and S.M. Reddy, "Techniques for minimizing power dissipation in scan and combinational circuits during test application," IEEE Trans. CAD, vol. 17, pp. 1325-1333, Dec. 1998.

M. ElShoukry, C.P. Ravikumar, and M. Tehranipoor, "Partial gating optimization for power reduction during test application," Proc. ATS, pp. 242-247, 2005.

S. Gerstendorfen and H.-J. Wunderlich, "Minimized power consumption for scan-based BIST," Proc. ITC, pp. 77-84, 1999.

P. Girard, C. Landrault, S. Pravossoudovitch, A. Virazel, and H.-J. Wunderlich, "High defect coverage with lowpower test sequences in a BIST environment," IEEE Design & Test of Computers, vol. 19, pp. 44-52, Sep.-Oct. 2002.

P. Girard, N. Nicolici, X. Wen (ed.), Power-Aware Testing and Test Strategies for Low Power Devices, Springer, New York 2010.

T.-C. Huang and K.-J. Lee, "Reduction of power consumption in scan-based circuits during test application by an input control technique," IEEE Trans. CAD, vol. 20, pp. 911-917, Jul. 2001.

T.-C. Huang and K.-J. Lee, "A token scan architecture for low power testing," Proc. ITC, pp. 660-669, 2001.

V. Iyengar and K. Chakrabarty, "Precedence-based, preemptive, and power-constrained test scheduling for system-onchip," Proc. VTS, pp. 368-374, 2001.

S. Kajihara, K. Ishida, and K. Miyase, "Test vector modification for power reduction during scan testing," Proc. VTS, pp. 160-165, 2002.

K.-J. Lee, T.-C. Huang, and J.-J. Chen, "Peak power reduction for multiple-scan circuits during test application," Proc. ATS, pp. 453-458, 2000.

J. Lee and N. A. Touba, "Low power test data compression based on LFSR reseeding," Proc. ICCD, pp. 180-185, 2004.

J. Lee and N. A. Touba, "LFSR-reseeding scheme achieving low-power dissipation during test," IEEE Trans. CAD, vol. 26, pp. 396-401, Feb. 2007.

J. Li, X. Liu, Y. Zhang, Y. Hu, X. Li, and Q. Xu, "On capture power-aware test data compression for scan-based testing," Proc. ICCAD, pp. 67-72, 2008.

X. Liu and Q. Xu, "On simultaneous shift- and capturepower reduction in linear decompressor-based test compression environment," Proc. ITC, paper 9.3, 2009.

N. Nicolici, B.M. Al-Hashimi, and A.C. Williams, "Minimization of power dissipation during test application in fullscan sequential circuits using primary input freezing," IEE Proc. Computers Digital Techniques, vol. 147, pp. 313-322, Sep. 2000.

J. Rajski, J. Tyszer, M. Kassab, and N. Mukherjee, "Embedded deterministic test," IEEE Trans. CAD, vol. 23, pp. 776-792, May 2004.

S. Remersaro, X. Lin, Z. Zhang, S.M. Reddy, I. Pomeranz, and J. Rajski, "Preferred fill: a scalable method to reduce capture power for scan based designs," Proc. ITC, paper 32.2, 2006.

P. M. Rosinger, B. M. Al-Hashimi, and N. Nicolici, "Low power mixed-mode BIST based on mask pattern generation using dual LFSR re-seeding," Proc. ICCD, pp. 474-479, 2002.

P. M. Rosinger, B. M. Al-Hashimi, and N. Nicolici, "Scan architecture with mutually exclusive scan segment activation for shift and capture power reduction," IEEE Trans. CAD, vol. 23, pp. 1142-1153, Jul. 2004.

R. Sankaralingam, R. R. Oruganti, and N.A. Touba, "Static compaction technique to control scan vector power dissipation," Proc. VTS, pp. 35-40, 2000.

R. Sankaralingam, B. Pouya, and Nur A. Touba, "Reducing power dissipation during test using scan chain disable," Proc. VTS, pp. 319-324, 2001.

R. Sankaralingam and N. A. Touba, "Controlling peak power during scan testing," Proc. VTS, pp. 153-159, 2002.

J. Saxena, K. B. Butler, and L. Whetsel, "An analysis of power reduction techniques in scan testing," Proc. ITC, pp. 670-677, 2001.

R. Shi and R Kapur, "How power-aware test improves reliability and yield," EE Times EDA news online, Sep. 15, 2004.

0. Sinanoglu, I. Bayraktaroglu, and A. Orailoglu, "Test power reduction through minimization of scan chain transitions," Proc. VTS, pp. 166-171, 2002.

S. Wang, "Generation of low power dissipation and high fault coverage patterns for scan-based BIST," Proc. ITC, pp. 834-843, 2002.

S. Wang and S. K. Gupta, "ATPG for heat dissipation Paper 9.2 International Test Conference 10 minimization during test application," IEEE Trans. Computers, vol. 47, pp. 256-262, Feb. 1998.

S. Wang and S.K. Gupta, "DS-LFSR: A BIST TPG for low switching activity," IEEE Trans. CAD, vol. 21, pp. 842-851, Jul. 2002.

S. Wang and S.K. Gupta, "An automatic test pattern generator for minimizing switching activity during scan testing activity," IEEE Trans. CAD, vol. 21, pp. 954-968, Aug. 2002.

S. Wang and S.K. Gupta, "LT-RTPG: A new test-per-scan BIST TPG for low switching activity," IEEE Trans. CAD, vol. 25, pp. 1565-1574, Aug. 2006.

S. Wang and W. Wei "A technique to reduce peak current and average power dissipation in scan designs by limited capture," Proc. ASP-DAC, pp. 810-816, 2007.

X. Wen, K. Miyase, S. Kajihara, T. Suzuki, Y. Yamato, P. Girard, Y. Ohsumi, and L.-T. Wang, "A novel scheme to reduce power supply noise for high-quality at-speed scan testing," Proc. ITC, paper 25.1, 2007.

X. Wen, Y. Yamashita, S. Kajihara, L. Wang, K. K. Saluja, and K. Kinoshita, „On low-capture-power test generation for scan testing, Proc. VTS, pp. 265-270, 2005.

X. Wen, Y. Yamashita, S. Morishima, S. Kajihara, L. Wang, K.K. Saluja, and K. Kinoshita, "Low-capture-power test generation for scan-based at-speed testing," Proc. ITC, pp. 1-10, 2005.

L. Whetsel, "Adapting scan architectures for low power operation," Proc. ITC, pp. 863-872, 2000.

M.-F. Wu, J.-L. Huang, X. Wen, and K. Miyase, "Reducing power supply noise in linear decompressor based test data compression environment for at-speed scan testing," Proc. ITC, paper 13.1, 2008.

* cited by examiner

LOW POWER COMPRESSION OF INCOMPATIBLE TEST CUBES

RELATED APPLICATIONS

This application claims priority to U.S. Provisional Patent Application No. 61/314,566, entitled "Low Power Compression Of Incompatible Test Cubes," filed on Mar. 16, 2010, and naming Dariusz Czysz et al. as inventors, which application is incorporated entirely herein by reference.

FIELD OF THE INVENTION

The present invention relates to the field of testing integrated circuits. Various aspects of the invention may be particularly useful for reducing power consumption during testing.

BACKGROUND OF THE INVENTION

Design-for-testability ("DFT") techniques based on scan and automatic test pattern generation ("ATPG") are commonly used as part of integrated circuit manufacturing to provide high test coverage. For large circuits, however, the volume of test data required to test such circuits can cause a significant increase in test time and tester memory requirements. In order to cope with these challenges, various test data reduction schemes have been introduced. Some test data reduction schemes, for example, use on-chip decompression and compression hardware. By using such hardware, a tester can deliver test patterns in a compressed form, and the on-chip decompressor can expand (or decompress) the compressed test patterns into the actual data loaded into scan chains. The decompression operation is possible because typically only a small number of bits in the decompressed test patterns are specified bits designed to target one or more specific faults in the integrated circuit. The remaining unspecified bits of the decompressed test pattern are termed "don't care" test pattern bits and are typically randomly determined as a result of the decompressor structure. The high number of randomly filled test pattern bits, however, can cause excessive switching in the scan cells of the scan chains as the decompressed test pattern is loaded. This, in turn, leads to undesirably high power consumption during the test procedure.

Similarly, the test responses that are captured after the test patterns have been loaded into the scan chains and launched into the system logic often contain many test response bits that are not indicative of either the presence or the absence of any targeted fault. Because these test response bits do not contribute to fault detection or diagnosis, such test response bits can be termed "don't care" test response bits. As with the "don't care" test pattern bits, the "don't care" test response bits can also cause excessive switching in the scan cells of the scan chains when the test response is captured and/or when the test response is shifted out of the scan chains.

In D. Czysz, G. Mrugalski, N. Mukherjee, J. Rajski, J. Tyszer, "Compression based on deterministic test vector clustering of incompatible test cubes," *Proc. ITC*, paper 9.2, 2009, which is hereby incorporated herein by reference, a test data compression scheme was introduced that explores the occurrence of similar vectors in test stimuli. In such a test data compression scheme, test cubes that share many similar specified bits are merged even in the presence of conflicts to increase the encoding efficiency and the compression ratio. The test vector obtained after merging is referred to as a parent pattern. To recover a test pattern from the parent pattern, the location and value information of conflict bits for this particular pattern is needed. The location information is stored in a set of data called the control pattern, while the value information is stored in another set of data called the incremental pattern. Like parent patterns, control patterns and incremental patterns are compressed before delivery to a circuit under test. Accordingly, the decompressor usually includes three decompressor modules/units for decompressing parent, incremental and control patterns, respectively, and combination circuitry for combining parent patterns and incremental patterns based on control patterns. Such a deterministic compression of incompatible test cubes offers very high compression ratios, elevates the encoding efficiency, and preserves all benefits of continuous flow decompression. The scheme, however, may consume more power than the power limit for which a circuit-under-test is rated. This power consumption is primarily attributed to the switching activity during the scan chain loading, capturing, and/or unloading processes that may go well beyond that of the functional mode.

The excessive power used during the scan chain loading, capturing, and/or unloading processes can result in overheating or supply voltage noise, either of which can cause a device to malfunction, be permanently damaged, or exhibit reliability degradation due to accelerated electro-migration. Accordingly, improved methods and test architectures for reducing power consumption during testing are desired.

BRIEF SUMMARY OF THE INVENTION

Disclosed are representative examples of methods, apparatus, and systems for reducing power consumption during circuit testing that, employ techniques of deterministic vector clustering of incompatible test cubes. According to various embodiments of the invention, low toggling parent patterns are used to reduce power consumption. The low toggling parent patterns may be generated using a decompressor unit including one or more shadow registers. To further reduce power consumption, low toggling control patterns are used. In some embodiments, biasing circuitry (or biasing logic) is added to a conventional decompressor unit for control patterns to lower toggling of control patterns. In still other embodiments, a control gater may be added to a conventional decompressor unit for control patterns to lower toggling of control patterns.

DETAILED DESCRIPTION OF THE INVENTION

General Considerations

Figure 1:
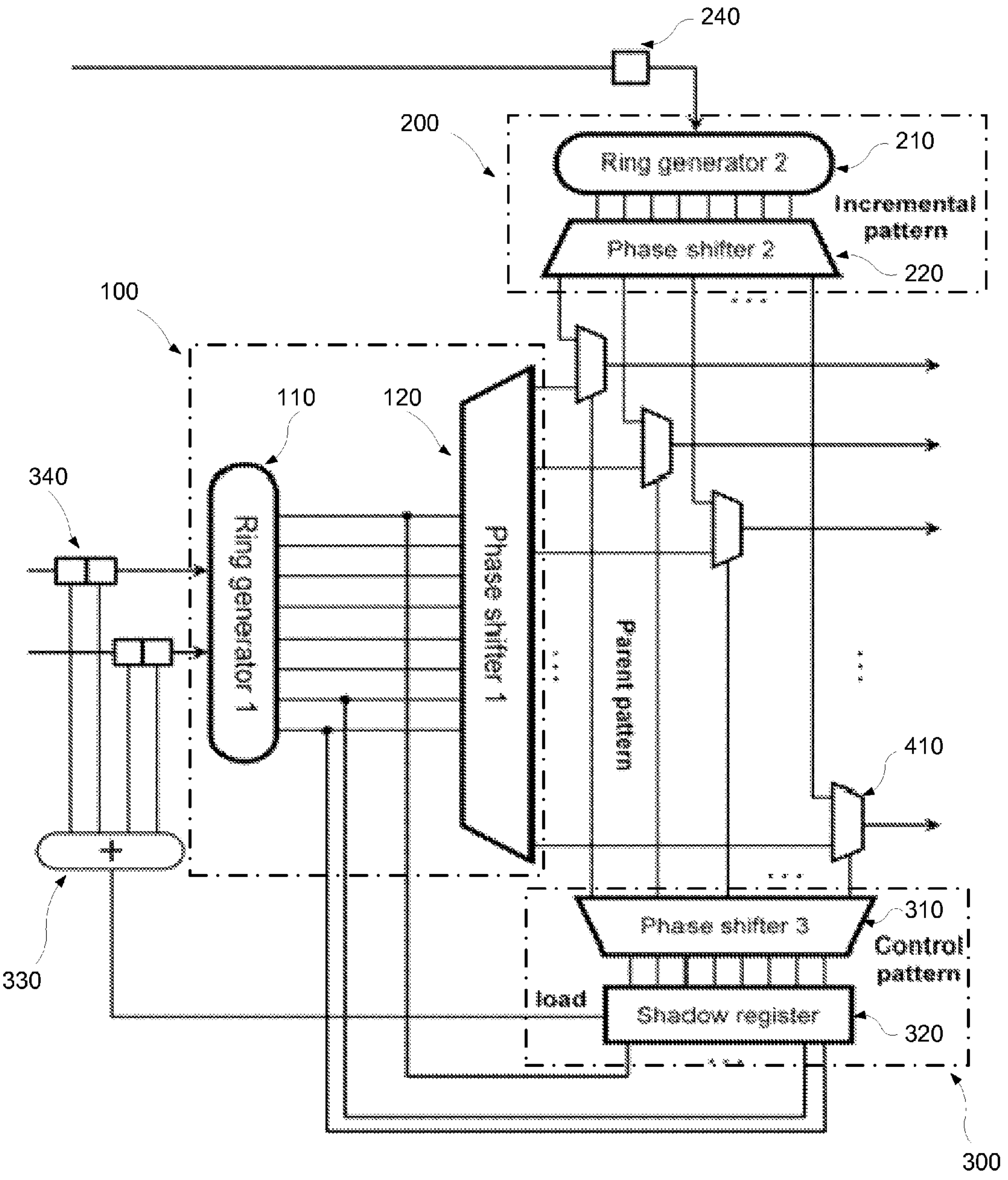
FIG. 1 illustrates a schematic block diagram of an exemplary decompressor architecture.

Various aspects of the present invention relate to reducing power consumption during testing integrated circuits. In the following description, numerous details are set forth for the purpose of explanation. However, one of ordinary skill in the art will realize that the invention may be practiced without the use of these specific details. In other instances, well-known features have not been described in details to avoid obscuring the present invention.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "evaluate" and "determine" to describe the disclosed methods. These terms are high-level abstractions of the actual operations that are performed. The actual operations that correspond to these terms may vary depending on the particular implementation and are readily discernible by one of ordinary skill in the art.

The disclosed apparatus can be implemented in a wide variety of scan-based or partially-scan-based circuits (e.g., application-specific integrated circuits ("ASICs") (including mixed-signal ASICs), systems-on-a-chip ("SoCs"), or programmable logic devices ("PLDs"), such as field programmable gate arrays ("FPGAs")). Such circuits can be used in a vast assortment of electronic devices, ranging from portable electronics (e.g., cell phones, media players, and the like) to larger-scale items (e.g., computers, control systems, airplanes, automobiles, factories, and the like). All such items comprising one or more circuits having embodiments of the disclosed testing apparatus are considered to be within the scope of this disclosure.

Any of the disclosed apparatus can be described or represented as design data or design information stored on one or more computer-readable media. For example, any of the disclosed testing architectures can be described or represented in an HDL file (such as a Verilog, VHDL, or register-transfer level file), a gate-level netlist, or other such EDA design file (e.g., a GDSII file or Oasis file). Such design data or design information can be created in whole or in part through the use of software comprising computer-executable instructions stored on computer-readable media (e.g., computer-readable media, such as one or more CDs, volatile memory components (such as DRAM or SRAM), or nonvolatile memory components (such as hard drives)). Any of the disclosed techniques can also be implemented in whole or in part by software comprising computer-executable instructions stored on computer-readable media. Such software can comprise, for example, an appropriate electronic design automation ("EDA") software tool (e.g., an automatic test pattern generation ("ATPG") tool).

Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

Any of the disclosed methods can also be performed in a computer simulation or other EDA environment (e.g., in a simulation environment where test patterns are simulated as being applied to representations of circuits). For example, the disclosed methods can be performed using circuit design information representative of a circuit-under-test and the associated test hardware (for example, a netlist, HDL file (such as a Verilog, or VHDL file), RTL file, GDSII file, Oasis file, or the like) and stored on computer-readable media. For presentation purposes, however, the present disclosure sometimes refers to the circuit-under-test (including the various components of the circuit-under-test) and the associated testing hardware (including the various components of the hardware) by their physical counterparts (for example, scan chains, scan cells, shift register, shadow register, and other such terms). It should be understood, however, that any such reference in the detailed description or claims not only includes the physical components but also includes representations of such components as are used in simulation, automatic test pattern generation, or other such EDA environments.

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit.

Furthermore, as used herein, the term "decompressor" refers to one or more functional units that decompress compressed test stimuli (or compressed test data), such as deterministic test stimuli from external test equipment, for delivery to a circuit-under-test on the chip. A decompressor can be implemented in various forms. Such forms can include, but are not restricted to, broadcast circuits, selectable broadcast circuits, combinational circuits (including, but not limited to, MUX-based or XOR-based combinational circuits) with or without biasing circuits, feedback shift registers with or without phase shifters and/or biasing circuitry, and/or a feedback shift registers with reseeding. A decompressor may also includes multiple decompressor units, each of which is used to decompress various portions of compressed test stimuli such as compressed data for parent, incremental and control patterns as discussed below.

It should be noted that any particular term usage such as the term "decompressor" should not be construed as limiting, as a term may encompass additional features understood by those of ordinary skill in the art or indicated by the context of how the term is used.

Compression of Incompatible Cubes

Embedded Deterministic Test (EDT)-based compression uses cube merging to reduce a pattern count, and hence to reduce test time and the amount of test data. Additional details concerning EDT-based compression and decompression are found in J. Rajski, J. Tyszer, M. Kassab, and N. Mukherjee, "Embedded deterministic test," *IEEE Trans. CAD*, vol. 23, pp. 776-792, May 2004, and U.S. Pat. Nos. 6,327,687; 6,353,842; 6,539,409; 6,543,020; 6,557,129; 6,684,358; 6,708,192; 6,829,740; 6,874,109; 7,093,175; 7,111,209; 7,260,591; 7,263,641; 7,478,296; 7,493,540; 7,500,163; 7,506,232; 7,509,546; 7,523,372; 7,653,851, all of which are hereby incorporated herein by reference. In general, EDT-based compression gradually expands a test pattern by incorporating successive compatible test cubes with appropriate values assigned to unspecified positions. It appears that the encoding efficiency and the compression ratio significantly increase in this process, if the cube merging continues despite conflicts on certain positions. Consequently, each resulting cluster contains one so-called parent pattern and a number of its derivatives obtained by imposing some extra bits on the parent pattern. In order to load scan chains with patterns that feature the original test cubes, it is desirable to keep only data necessary to recreate (decompress) parent patterns as well as information regarding locations and values of the corresponding incremental (conflicting) bits. These two groups of data are referred to as control and incremental patterns, respectively. A test controller (or controller) can then deliver different test patterns by repeatedly applying the same parent pattern, every time using a different incremental pattern. For delivering each test pattern, at every scan shift cycle (or at selected scan shift cycles), the controller uses a control pattern to decide whether a given scan chain receives data from the parent pattern or from the corresponding incremental pattern.

FIG. 1 shows an embodiment of an exemplary decompressor employing the above approach. The illustrated decompressor comprises three modules or decompressor units 100, 200, and 300 designated to handle individually parent patterns, incremental patterns, and control patterns, respectively. As can be seen, a 2-input multiplexer (e.g. the multiplexer 410) is placed in the front of each scan chain. These devices are intended to route decompressed test data from one of two sources: (1) the decompressor unit 100 that primarily works with parent patterns, or (2) the decompressor unit 200 for that works with incremental patterns. The actual source is determined by applying appropriate select signals to the multiplexers 410. These select signals are provided by the third decompressor unit 300 employed here to handle control patterns.

According to the exemplary embodiment illustrated in FIG. 1, ring generator 1 (110) and phase shifter 1 (120) form a sequential continuous flow decompressor, the decompressor unit 100. Exemplary logic synthesis and corresponding compression methods for implementing the decompressor are presented in the EDT paper and patents incorporated by referenced above. This decompressor unit 100 is deployed mainly to decode the parent patterns, which are subsequently fed to the scan chains unless the control signals determine otherwise.

Control patterns often feature a relatively large number of bits with a value of zero (corresponding to the specified bits of the parent patterns) with the sparse presence of bits with a value of one (corresponding to the bits of conflicts). It should be noted that in other embodiments of the invention, the control patterns may use bits with a value of one to indicate the locations of the specified bits of the parent patterns and bits with a value of zero to indicate the locations of the bits of conflicts. To encode such patterns it suffices to target only a small subset of 0-bits as long as they occur in sequences not interspersed with 1-bits. In the illustrated embodiment, for example, a shadow register 320 placed between ring generator 1 (110) and phase shifter 3 (310) facilitates encoding of such patterns. Original seed variables may be used to deliver the register load enable signal, as shown in FIG. 1. Small input buffers 340 drive parity computing circuitry 330 to compute a parity of the variables, including data used in previous cycles. The parity computing circuitry 330 may be an XOR tree or an XNOR tree. The output of the parity computing circuitry 330 serves as the register load enable signal. If this signal is 1, then the shadow register 320 is reloaded with the current content of ring generator 1 (110) before new variables enter the decompressor. Otherwise, the content of the register 320 remains unchanged. It should be noted that the value for the load enable signal can be set as either 1 or 0 for causing the shadow register 320 to reload.

Ring generator 2 (210) and phase shifter 2 (220) are used to decode incremental patterns. As they feature extremely low fill rates, only a subset of variables, which would be injected within the conventional EDT framework, is required. Hence, injections of new test data occur regularly in occasional and predetermined scan shift cycles. Alternatively, new variables can be buffered, for a requested number of cycles, as shown with a drawn box 240 at the top of FIG. 1.

The compression scheme resting on merging of incompatible test cubes can elevate compression ratios and the encoding efficiency to levels significantly higher than what is achievable through the conventional dynamic reseeding. The resultant scan toggling profile remains, however, similar to that of other decompression techniques. This is best illustrated in Table I where the switching activity for six industrial designs, ranging in size from 220K to 2.2 M gates, is presented. The table provides the basic data regarding these designs such as the number of gates, scan architecture, test patterns (all experiments reported here were performed for both stuck-at tests and launch-off-capture transition tests), and the total number of specified bits these patterns feature. Furthermore, information regarding all test cases (including a decompressor setup, the resultant numbers of parent and incremental patterns as well as the compression ratios) is also reported. Finally, the switching activity is represented in the last column of the table. It is estimated by the weighted transition metric (WTM) that counts the number of invoked transitions in successive scan cells, while taking into account their relative positions.

TABLE I

CIRCUIT CHARACTERISTICS AND AVERAGE SWITCHING ACTIVITY

| Design | Gates | Test patterns | Specified bits | Scan chains (no × size) | Ring 1 inputs | Ring 2 inputs | Allowed conflicts | Parent patterns | Incremental patterns | Compression [x] | Toggling (WTM) [%] |
|---|---|---|---|---|---|---|---|---|---|---|---|
| D1 | 220K | 1,573 | 171,192 | 122 × 104 | 64-6 | 16-1 | 20 | 23 | 1,963 | 373 | 50.26 |
| | | | | 122 × 104 | 64-5 | 16-1 | 16 | 36 | 1,892 | 367 | 49.31 |
| D2 | 545K | 3,223 | 1,408,878 | 128 × 353 | 64-5 | 16-1 | 32 | 84 | 6,938 | 416 | 49.85 |
| | | | | 128 × 353 | 64-6 | 16-1 | 32 | 76 | 6,361 | 415 | 49.47 |
| D3 | 1.3M | 4,214 | 1,728,581 | 80 × 1081 | 64-3 | 24-1 | 32 | 73 | 5,209 | 754 | 49.82 |
| | | | | 80 × 1081 | 64-4 | 24-1 | 28 | 59 | 3,983 | 748 | 48.57 |

TABLE I-continued

CIRCUIT CHARACTERISTICS AND AVERAGE SWITCHING ACTIVITY

| Design | Gates | Test patterns | Specified bits | Scan chains (no × size) | Ring 1 inputs | Ring 2 inputs | Allowed conflicts | Parent patterns | Incremental patterns | Compression [x] | Toggling (WTM) [%] |
|---|---|---|---|---|---|---|---|---|---|---|---|
| D4 | 1.1M | 10,466 | 5,127,107 | 80 × 878 | 64-6 | 16-1 | 32 | 70 | 8,810 | 1,132 | 48.96 |
| | | | | 80 × 878 | 64-6 | 16-1 | 28 | 78 | 8,758 | 1,098 | 48.95 |
| D5 | 260K | 37,050 | 6,084,081 | 120 × 119 | 32 4 | 16 1 | 32 | 972 | 36,287 | 317 | 48.62 |
| | | | | 120 × 119 | 64-3 | 16-1 | 32 | 1001 | 36,915 | 303 | 48.55 |
| D6 | 2.2M | 24,137 | 1,833,154 | 244 × 538 | 64-3 | 16-1 | 28 | 169 | 25,520 | 4,570 | 49.39 |
| | | | | 160 × 897 | 32-4 | 16-1 | 28 | 117 | 25,227 | 3,975 | 48.74 |

The six designs in Table I feature an average weighted transition metric close to 50%.

Low Toggling Parent Patterns

According to certain embodiments of the disclosed technology, the number of transitions in parent patterns is decreased to reduce the degree of switching in scan chains. This approach can have a significant impact on the total transition count because these patterns are repeatedly applied to the decompressor (many of them hundreds of times).

Figure 2:
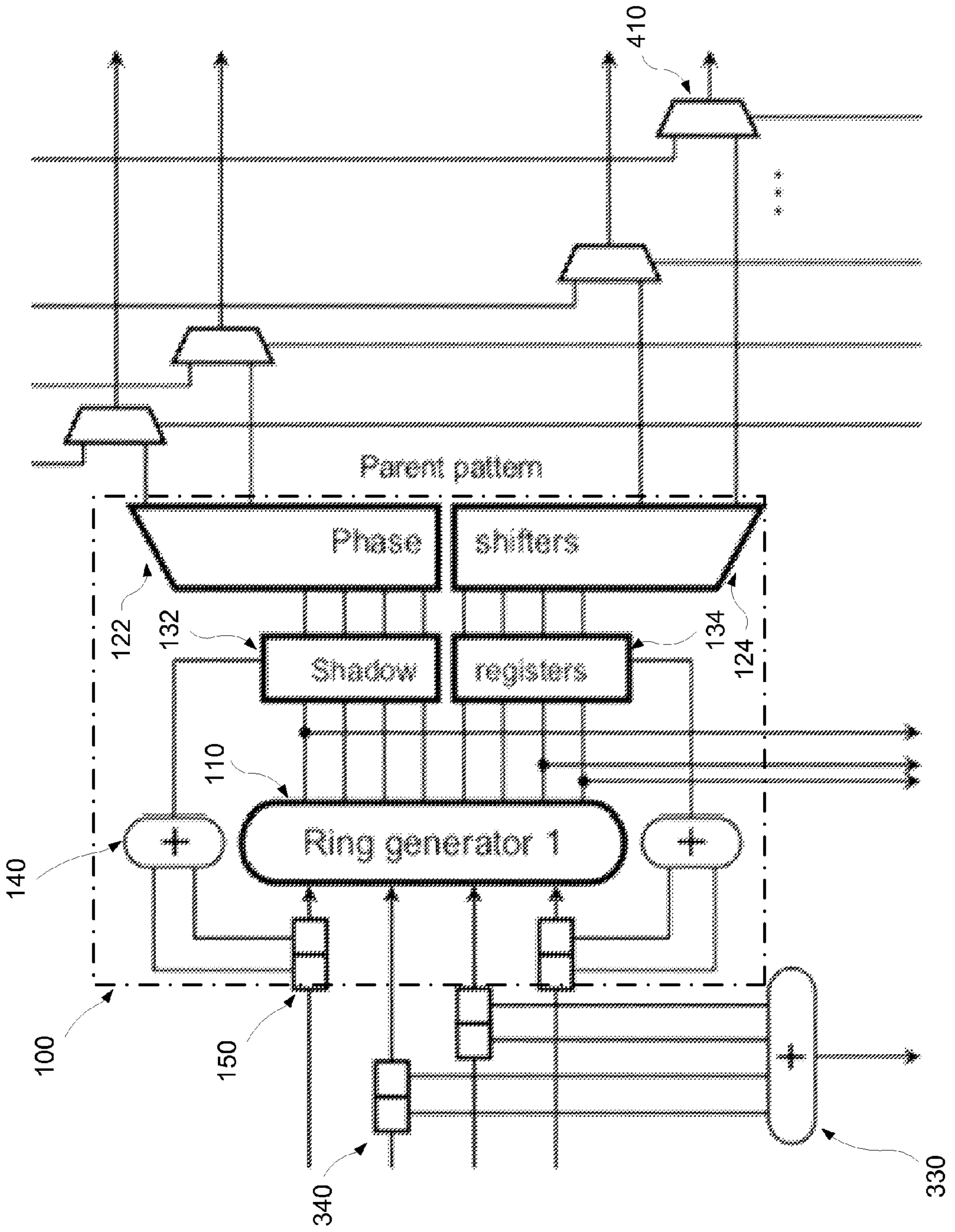
FIG. 2 illustrates a schematic block diagram of an exemplary low power parent pattern decompressor according to various embodiments of the invention.

In order to deliver low power parent patterns according to some embodiments of the disclosed technology, one or more shadow registers may be incorporated to the decompressor unit 100. As shown in FIG. 2, the exemplary technique uses two shadow registers (132 and 134) and the associated phase shifters (122 and 124) driving two groups of scan chains with the same test data repeated for a number of shift cycles, thereby reducing the number of transitions. Decompressor input channels are used to facilitate the operation of both registers in a manner similar to that of the shadow register 320 producing control patterns (see FIG. 1). As a result, additional flip-flops such as 150, placed in parallel with the decompressor channels, buffer input variables, which subsequently drive XOR (or XNOR) trees such as 140 computing parity bits for input variables injected during the latest shift cycles. If the parity computed by the tree 140 is odd, then the shadow register 132 is reloaded. Otherwise, the shadow register 132 supplies the same test data to the phase shifter 122. It should be noted that the shadow register 132 may also be set to reload if the parity is even and not to reload if the parity is odd. The input buffers allow even decompressors with a small number of channels to control shadow registers with no negative impact on their actual encoding capabilities. It should be noted that input channels used to update the shadow registers associated with the parent and control patterns are disjoint in some embodiments of the invention as shown in FIG. 2. Moreover, the two parent shadow registers (rather than a single one) are deployed primarily to circumvent effects of frequent reloads caused by different values in two adjacent stages of scan chains. Indeed, certain specified bits may cause transitions in one group of scan chains. Scan chain values of the other group, however, will remain constant as the second register continues to feed these scan chains using its previous content.

The scheme of FIG. 2 was tested on the industrial designs reported earlier in Table I. Results of the experiments are summarized in Table II. Similarly to Table I, the first part of Table II lists various performance-related statistics of the scheme. The second-to-last column of the table provides information regarding the average scan shift-in switching activity. As can be seen, the degree of toggling is reduced, on the average, to the values between 25% and 30%. It is worth noting that the exemplary scheme of FIG. 2 does not drastically affect the original compression (reported in the fifth column). The other compression related data are available in columns from 2 to 4.

TABLE II

POWER AWARE PARENT PATTERNS

| Design | Allowed conflicts | Parent patterns | Incremental patterns | Compression [x] | Toggling [%] | Incremental bits [%] |
|---|---|---|---|---|---|---|
| D1 | 20 | 29 | 2,248 | 331 | 30.48 | 47.74 |
| | 16 | 46 | 2,310 | 300 | 29.74 | 48.19 |
| D2 | 32 | 117 | 8,602 | 330 | 29.29 | 48.21 |
| | 32 | 91 | 7,753 | 357 | 30.23 | 47.45 |
| D3 | 32 | 109 | 5,965 | 532 | 28.87 | 48.44 |
| | 28 | 115 | 6,012 | 518 | 27.45 | 49.12 |
| D4 | 32 | 50 | 8,006 | 1,403 | 26.19 | 45.32 |
| | 20 | 57 | 8,298 | 1,332 | 26.57 | 45.19 |
| D5 | 32 | 944 | 36,265 | 296 | 25.36 | 47.75 |
| | 32 | 972 | 36,846 | 284 | 26.17 | 48.23 |
| D6 | 28 | 151 | 25,861 | 4,249 | 27.37 | 48.30 |
| | 28 | 163 | 25,965 | 4,211 | 27.93 | 48.51 |

Although acceptable in many practical situations, the resultant toggling of 30% may remain above the threshold determined by a design mission mode. Hence, it is desirable to use further means of reducing the switching level. It has been observed that despite very low transition counts in parent patterns, only fractions of parent bits actually populate scan chains. The remaining positions are filled with the incremental bits, which are injected into scan chains not only when needed, but also as a side effect of having don't care bits in control patterns. In order to illustrate this phenomenon, the last column of Table II gives a percentage of scan cells hosting incremental bits. This percentage is much higher than a control pattern fill rate and remains close to 50%.

Low Toggling Control Patterns

Figure 3:
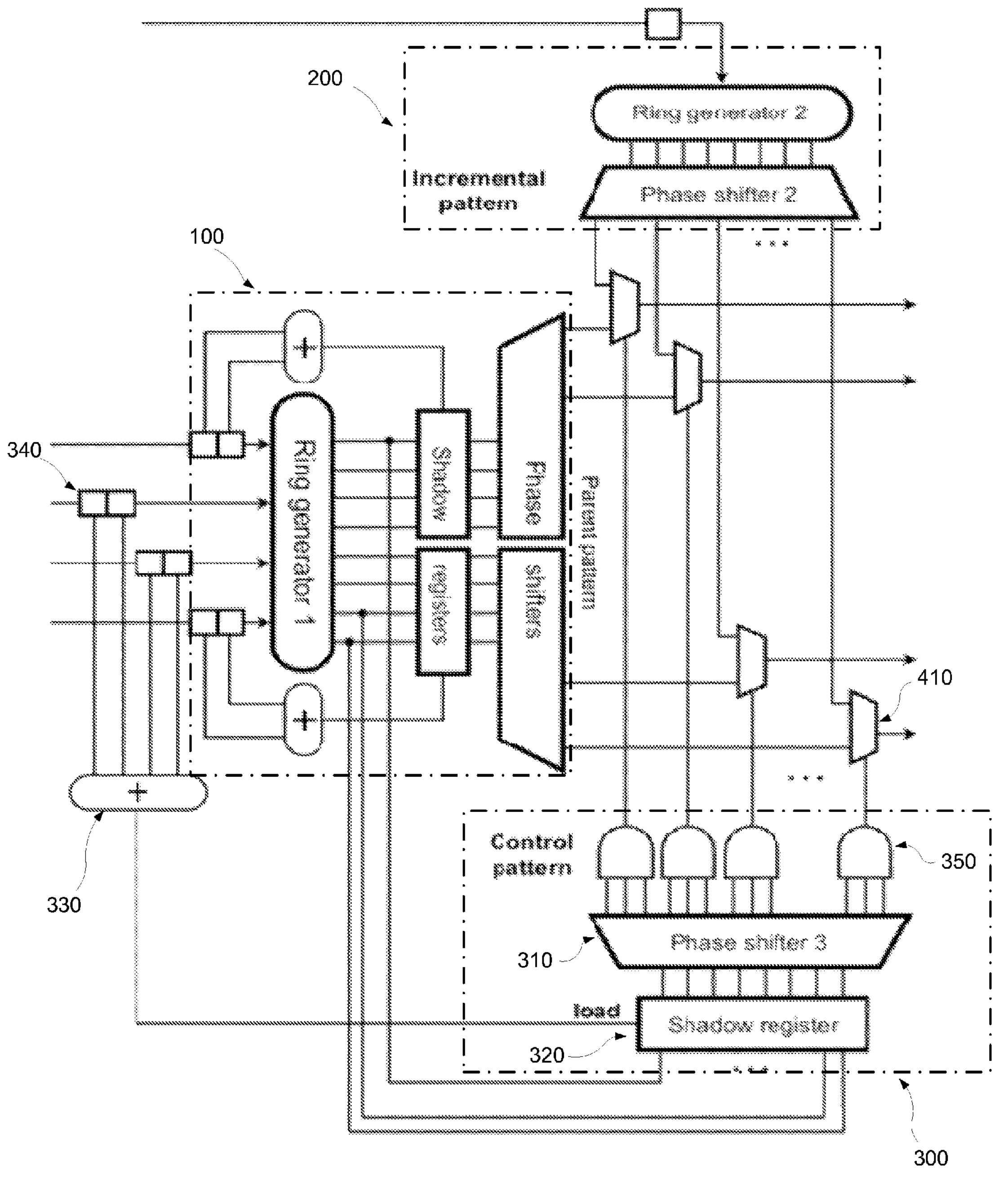
FIG. 3 illustrates a schematic block diagram of an exemplary decompressor architecture with biasing circuitry according to various embodiments of the invention.

To change the fraction of scan cells receiving data from incremental patterns, biasing circuitry (or biasing logic) may be added to the decompressor unit for control patterns 300 according to various embodiments of the invention. FIG. 3 illustrates a schematic block diagram of an exemplary decompressor architecture in which a group of 3-input AND gates 350 function as biasing circuitry. With these gates in place, the decompressor unit 300 may be capable of driving approximately 12.5% of multiplexers with the value of 1, thus allowing incremental bits to reach scan chains in the same proportion. This percentage can be reduced even further by adding more inputs to the AND gates. For example, the fourth input reduces the percentage of scan cells receiving incremental data down to 6.25%, while the fraction of scan chains getting values provided by parent patterns increases accordingly. Such an approach, however, places additional burden on the encoding process and may result in a compression drop, as shown below.

As in many traditional compression schemes, specified bits occurring in parent, control, and incremental patterns may be represented by linear functions of variables injected into the decompressor. A compressed pattern can then be determined by solving the system of linear equations in the Galois field modulo 2. Encoding of control patterns is of a special interest here as they feature repetitive sequences of 0-bits, while 1-bits occur sparsely. This property allows reducing the volume of test data by providing the identical data to the multiplexers for a number of scan shift cycles. In particular, the encoding technique according to certain embodiments of the disclosed technology partition a given control pattern into blocks comprising a certain number of consecutive slices such that there are no scan chains that would receive data from both parent and incremental patterns within the same block. This allows a given control combination to be repeated many times in succession by using the shadow register storing a state that the ring generator entered at the beginning of a block. It is worth noting that this method gives the ring generator enough time to compensate for fading encoding ability by collecting new input variables.

The use of biasing circuitry can add certain constraints to the original control-pattern-encoding technology. If a specified 1-bit is to be encoded (it selects data from the incremental pattern), then c linear equations, set to 1, are solved as they represent outputs of phase shifter 3 (310) driving a particular c-input AND gate (e.g., a 3-input AND gate 350 in the example illustrated in FIG. 3). In order to encode a 0-bit, a single equation corresponding to one of the c inputs of a respective AND gate can be used. This flexibility is valuable when a control pattern cannot be compressed—there are still other inputs that can be tried instead, as setting the control signal to 0 requires only one of the inputs to be de-asserted. It is worth noting that trying alternative equations (the inputs of AND gates) does not typically compromise a solver's performance as it runs in the incremental mode. New equations are added gradually to already existing expressions. Gaussian elimination is performed on the newly added equations as well as those introduced earlier. When it is not possible to solve such equations, the previous set of equations (e.g., one step backward) can be used.

The control of the shadow register can be the subject of partitioning in a manner similar to that of the parent patterns. Experimental results obtained for a decompressor working with exemplary biasing logic are presented in Table III. The same test cases are used as those of the previous sections. The illustrated biasing logic employs 3-input AND gates. These gates were experimentally selected based on a trade-off between the switching activity during scan shift-in and the compression ratio. 2-input gates could also be used, but were not selected because they were not sufficient to significantly reduce the number of transitions. Larger fan-ins could also be used but were not selected because they had an undesirable impact on the compression. For example, using 2-input AND gates to form biasing logic for design D1 typically yielded a toggling rate at the level of 19%, whereas increasing the gate fan-in to four led to a compression ratio approximately in the range of 220× (lower than a conventional EDT-based compression can offer for this test case). In the experiments, the shadow register and associated phase shifter 3 were partitioned into two blocks. As can be noticed, there is a significant reduction in scan toggling as compared to the results gathered in Table II. Typically, with the selected AND gates, the average switching Table activity varies from approximately 5 percent to approximately 13 percent. It will be appreciated by those of ordinary skill in the art that the contribution of incremental bits is reduced in the final test patterns.

TABLE III

THE USE OF BIASING LOGIC

| Design | Parent patterns | Incremental patterns | Compression [x] | Toggling [%] | Incremental bits [%] |
|---|---|---|---|---|---|
| D1 | 59 | 2,419 | 241 | 11.36 | 12.46 |
| | 75 | 2,739 | 223 | 10.83 | 12.20 |
| D2 | 196 | 10,466 | 235 | 12.88 | 12.88 |
| | 150 | 9,071 | 261 | 12.30 | 12.92 |
| D3 | 160 | 7,337 | 398 | 11.60 | 12.20 |
| | 178 | 7,587 | 382 | 11.35 | 12.73 |
| D4 | 197 | 9,376 | 569 | 3.77 | 5.52 |
| | 200 | 9,293 | 562 | 3.75 | 5.40 |
| D5 | 1340 | 38,289 | 287 | 8.89 | 6.38 |
| | 1516 | 36,290 | 263 | 7.41 | 7.41 |
| D6 | 197 | 26,282 | 3,720 | 9.39 | 12.08 |
| | 139 | 25,620 | 3,640 | 9.15 | 12.04 |

Encoding control patterns through biasing logic increases the amount of test data involved. It is pronounced in the columns reporting the number of parent and incremental patterns. Consequently, the resultant compression may be lower than that of the scheme presented in the next section, though it still remains much higher than compression offered by conventional dynamic reseeding.

Weighted Gating of Control Patterns

As mentioned earlier, a shadow register can be employed to exploit the predominance of bits with a zero value in control patterns. Given this type of pattern profile, certain embodiments of the disclosed technology may encode the first specified bit corresponding to scan chains (e.g., every scan chain) within a block of consecutive bits assigned to the same value. However, the significant savings are achieved at the price of the shadow register enable (update) signals, which must be encoded for the appropriate scan shift cycles (e.g., for every scan shift cycle).

Figure 4:
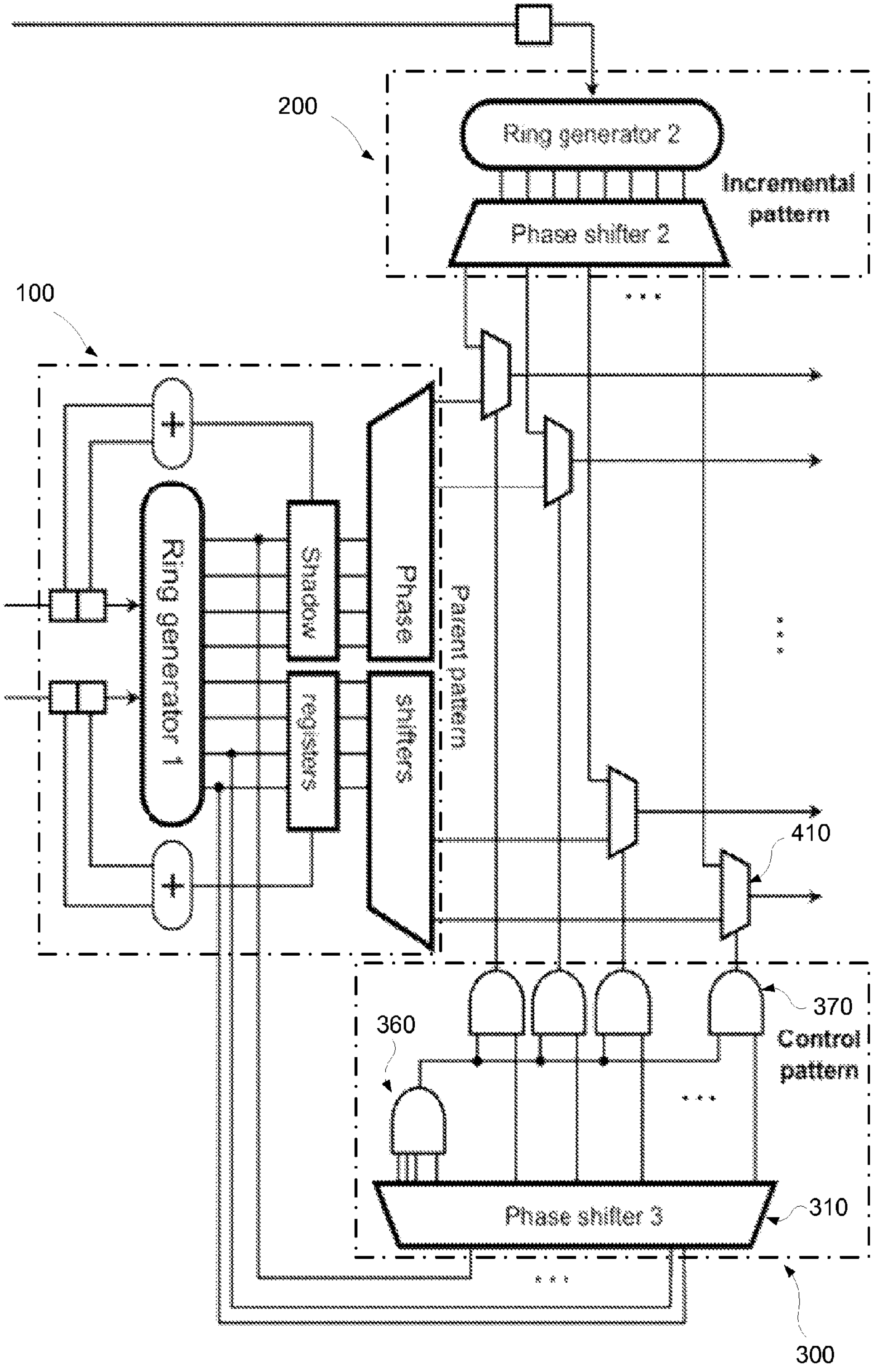
FIG. 4 illustrates a schematic block diagram of an exemplary decompressor architecture with a control gater according to various embodiments of the invention.

In contrast, FIG. 4 illustrates an exemplary approach in which the control pattern shadow register 320 is eliminated and replaced with simple biasing circuitry (including 370 and 360) that takes advantage of control-pattern particulars in a different manner. The illustrated circuitry is comprised of 2-input AND gates 370 driven by the actual control signals and one additional AND gate 360 with a larger, arguably programmable, fan-in. This particular gate 360 is driven by the outputs of the same phase shifter 3 (310) that is used to control the remaining AND logic 370. The role of the multiple-input AND gate 360 in the exemplary embodiment is to block propagation of signals produced by phase shifter 3 most of the time, and to force the logic value of 0 instead on the control inputs of the multiplexers such as 410. As a result, the switching between parent and incremental patterns can be significantly reduced without resorting to any form of a deterministic encoding. This device 360 is referred to hereinafter as a control gater. The probability of having the control gater inputs de-asserted is equal to $1-2^{-k}$, where k is the number of its inputs. Not only a random switching between the parent and incremental patterns can be governed this way, but also one can take advantage of having randomly produced zeros to take care of specified 0-bits in a control pattern whenever they do not coincide with another 1-bit during the same scan shift cycle. Such a technique is further discussed in the remaining part of this section.

Let $p_i$ and $c_i$ denote the i-th bit of the parent pattern and the control pattern, respectively. Recall that bits of the control pattern are defined as follows: 1) $p_i=0$ or $p_i=1 \Rightarrow c_i=0$, 2) $p_i=C \Rightarrow c_i=1$, 3) $p_i=x \Rightarrow c_i=x$, where C denotes a conflict occurring on positions where original test cubes that have been merged into a common parent pattern are incompatible, x represents a don't care value. In other words, the control pattern assumes the value of 0 every time the parent pattern features a specified value, while its value of 1 indicates that the parent pattern has a conflicting bit, and therefore the test data should be provided by the incremental pattern. This pattern, in turn, features the specified bits of 0 and 1 on some of the positions where $p_i=C$. By relying on the control gater 360, the decompressor of FIG. 4 can use the following rules to regulate the compression of control patterns according to certain embodiments of the disclosed technology. Whenever $c_i=1$, all k inputs of the control gater corresponding to a scan frame (a scan shift cycle) hosting the i-th bit of the control pattern are set to 1. This way, gating logic lets the control signal pass through and allows the resultant test pattern to receive data from the appropriate incremental pattern. In addition to the k inputs of the control gater being set to 1, specified control bits that are reset within the same time frame are encoded. Consequently, a set of linear equations will comprise (in this example) of k equations to produce the value of 1 on the output of the control gater plus one extra equation per every specified control bit.

In certain embodiments, for scan shift cycles with specified control bits set exclusively to 0, there is no need to encode all of them. Instead, the output of the control gater 360 can be set to 0. This, in turn, can be achieved by resetting one of its k inputs. As a result, control values will be set to 0 during that particular scan shift cycle, and hence the overall switching activity will be reduced since the corresponding parent pattern is also a power aware vector. In the vast majority of cases, this approach is compression-friendly as it replaces the need to encode all specified 0-bits with just a single equation. It is also worth noting that the inability to reset one of the control gater inputs is not equivalent to compression failure as one may try to repeatedly reset one of the remaining inputs. Should the resetting of the control gater eventually fail, there is still a possibility to encode the specified control bits directly, regardless of the output value of the control gater. The remaining scan frames (those populated with don't care bits) can be handled more versatilely. In principle, there is no need to enforce the output of the clock gater since it will stay de-asserted with the probability of $1-2^{-k}$ in any event, as observed earlier. Typically, it might be enough to reduce the degree of scan toggling. Nevertheless, after solving the related equations, all implied output values of the control gater can be determined, and an attempt can be made to further encode to 0 those cases in which the control gater assumes the output value of 1 (provided it does not harm compression). Then, having done that, embodiments of the disclosed technology can be used to further reduce the degree of swapping the parent patterns for the incremental ones. For example, let the parent pattern be as follows (five scan chains are positioned horizontally):

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| x | x | x | C | x | 1 | x | x | x | x | x | x | 0 | x | x | x | x | x | x | x | C | x | x | x | x | x | x | x | x | x | xx |
| x | x | x | x | x | x | x | x | 1 | x | x | x | x | x | x | x | x | x | 1 | x | x | x | x | x | x | x | x | 0 | x | 1 | xx |
| x | 1 | x | x | x | 1 | x | x | x | x | x | x | x | 0 | x | x | x | x | x | x | C | C | x | 1 | x | x | x | x | x | x | xx |
| x | x | x | 0 | x | 0 | x | x | x | C | x | x | x | x | x | x | x | x | x | x | x | x | x | x | x | x | x | x | x | x | xx |
| x | x | x | x | x | 1 | x | x | x | x | x | x | x | x | x | x | C | x | x | x | x | x | x | x | x | x | x | 1 | x | x | xx |

Suppose a decompressor uses a 4-input control gater. The corresponding control pattern is then of the following form (the last four rows at the bottom represent the control gater inputs):

| 1 | | | | 5 | | | | | 10 | | | | | 15 | | | | | 20 | | | | | 25 | | | | | 30 | |
|---|---|---|---|---|---|---|---|---|---|---|---|---|---|---|---|---|---|---|---|---|---|---|---|---|---|---|---|---|---|---|
| x | x | x | 1 | x | 0 | x | x | x | x | x | x | 0 | x | x | x | x | x | x | x | 1 | x | x | x | x | x | x | x | x | x | xx |
| x | x | x | x | x | x | x | x | 0 | x | x | x | x | x | x | x | x | x | 0 | x | x | x | x | x | x | x | x | 0 | x | 0 | xx |
| x | 0 | x | x | x | 0 | x | x | x | x | x | x | x | 0 | x | x | x | x | x | x | 1 | 1 | x | 0 | x | x | x | x | x | x | xx |
| x | x | x | 0 | x | 0 | x | x | x | 1 | x | x | x | x | x | x | x | x | x | x | x | x | x | x | x | x | x | x | x | x | xx |
| x | x | x | x | x | 0 | x | x | x | x | x | x | x | x | x | x | 1 | x | x | x | x | x | x | x | x | x | x | 0 | x | x | xx |
| | 0 | | 1 | | | | | | 1 | | | | 0 | | | 1 | | | | 1 | 1 | | | | | | | | 0 | |
| | | | 1 | | 0 | | | | 1 | | | | | | | 1 | | 0 | | 1 | 1 | | | | | | | | | |
| | | | 1 | | | | | 0 | 1 | | | | | | | 1 | | | | 1 | 1 | | 0 | | | | | | | |
| | | | 1 | | | | | | 1 | | | 0 | | | | 1 | | | | 1 | 1 | | | | | | 0 | | | |

According to certain embodiments of the disclosed technology, encoding the above control pattern comprises the following. Scan frames with specified bits set exclusively to 0 require only one of the control gater inputs to be set to 0 as well. The pattern above illustrates hypothetical assignments of zero values to arbitrarily selected inputs of the gater. Note that a sixth slice from the left features four specified zeros, whereas a single zero applied to the second input of the gater suffices to produce all desired control signals during this frame.

A different scenario applies to frames with at least one specified bit set to L. As can be seen, frames 4, 10, 17, 21, and 22 have all inputs of the control gater set to the value of 1 in order to effectively propagate the asserted control signals. Moreover, as the output of the gater is set to 1, the specified 0-bits occurring within these particular frames must be individually encoded as well.

the number of test patterns and the amount of test data reported in column "Total test data" of Table IV), and the resultant switching rates for scan load measured by means of the weighted transition metric.

TABLE IV

WEIGHTED GATING OF CONTROL PATTERNS

| Design | Scan chains (no × size) | Ring 1 inputs | Ring 2 | Control gater fan-in | Allowed conflicts | Parent patterns | Incremental patterns | Frames turned off [%] | Total test data | Compression [x] | Toggling (WTM) [%] |
|---|---|---|---|---|---|---|---|---|---|---|---|
| D1 | 66 × 191 | 64-5 | 16 | 2 | 24 | 18 | 1,898 | 45 | 53,717 | 369 | 27 |
| | 66 × 191 | 64-5 | 16 | 4 | 24 | 24 | 2,320 | 57 | 62,281 | 318 | 22 |
| | 66 × 191 | 64-3 | 16 | 4 | 32 | 42 | 3,210 | 69 | 78,540 | 252 | 16 |
| D2 | 128 × 353 | 64-4 | 16 | 2 | 32 | 136 | 9,108 | 54 | 363,886 | 400 | 24 |
| | 128 × 353 | 64-4 | 16 | 3 | 32 | 152 | 9,753 | 59 | 386,069 | 377 | 22 |
| D3 | 122 × 709 | 64-4 | 16 | 2 | 32 | 138 | 7,717 | 65 | 587,030 | 620 | 26 |
| | 122 × 709 | 64-3 | 16 | 3 | 32 | 235 | 9,729 | 75 | 684,606 | 532 | 19 |
| D4 | 160 × 439 | 64-4 | 16 | 2 | 32 | 145 | 11,442 | 73 | 456,076 | 1,611 | 15 |
| | 160 × 439 | 64-6 | 16 | 4 | 32 | 172 | 11,481 | 78 | 503,923 | 1,458 | 13 |
| D5 | 120 × 119 | 64-3 | 24 | 3 | 32 | 1,144 | 39,200 | 72 | 1,424,712 | 371 | 15 |
| | 120 × 119 | 64-3 | 24 | 3 | 24 | 1,410 | 37,654 | 77 | 1,500,131 | 352 | 13 |
| D6 | 244 × 588 | 64-4 | 16 | 4 | 32 | 109 | 25,230 | 72 | 693,286 | 4,995 | 17 |
| | 244 × 588 | 32-3 | 16 | 3 | 32 | 177 | 26,905 | 82 | 781,887 | 4,429 | 13 |

It may be desirable to ensure that the remaining bits of the control pattern having no specified values (don't cares) are blocked so that they do not reach the multiplexers, as shown in FIG. 4. Therefore, in some embodiments of the disclosed technology, values implied by a compression solver can be examined to see whether the output of the control gater is 1 for these cases. If so (in this example, it would be every 1 out of 16 time frames on the average), an attempt can be made to encode additional 0s on selected inputs of the gater in order to reduce the negative impact of randomly generated control signals on the resultant scan toggling.

The scheme of FIG. 4 with an undivided parent pattern shadow register was tested on the set of industrial designs characterized in Table I. The results of the experiments are summarized in Table IV. The first part of the table consists of four columns, each entry of which specifies the scan configuration and the decompressor architecture. Columns "Ring 1" and "Ring 2" are used to designate the size of ring generator 1 and ring generator 2, respectively. Information regarding the number of inputs (e.g., the number of decompressor channels connecting ATE with ring generator 1, as shown in FIG. 4) is given in the third column. Note that in the experiments, a single ATE channel feeding ring generator 2 is sufficient to operate the decompressor handling incremental patterns. Hence, this information is omitted from the table. The column "Control gater fan-in" provides the number of inputs for the multiple-input AND gate driven by phase shifter 3 (see FIG. 4).

The remaining columns of Table IV list various performance-related statistics of the scheme. In particular, for each test case the following information is provided: the maximal number of allowed conflicts when merging original test cubes (this number gives the largest amount of locations on which every single incremental pattern differs from its parent pattern (note that, given a parent pattern and its derivates, the total number of conflicting bits is usually much higher)), the number of parent (or alternatively control) and incremental patterns, the fraction of scan frames that receive data exclusively from the parent patterns due to the control gater set to the value of 0, the total test data volume used to encode all specified bits as described above, the effective test data volume compression (this quantity is obtained as a ratio of the following two values: the number of scan cells multiplied by As indicated by data in the last column of Table IV, application of the exemplary scheme can result in a significant (down to 13%) reduction in the total number of transitions leading to significantly reduced switching rates. In some examined test cases (designs D1, D2 and D3), the need to reduce the switching activity resulted in compression ratios slightly lower than those reported in Table I. On the other hand, for designs D4, D5 and D6, compression is even higher than that of the scheme of FIG. 1. In fact, design D6 with 64-bit parent pattern decompressor has achieved virtually 5,000× reduction of test data with the switching activity at the level of 17% only. In any event, embodiments of the disclosed technology have the ability to maintain significantly higher compression rates than those of the conventional EDT with unaffected test coverage. In other words, embodiments of the disclosed technology offer a good compromise for a class of power-aware ultra-compression applications. It is worth noting that the incremental pattern count (as shown in Table IV) is indicative of the expected test application time. Recall that tests are delivered by repeatedly applying successive parent patterns, every time using a next incremental pattern (a derivative of the current parent).

It is also interesting to compare the results presented in Table III and Table IV. As one may expect, each design features a "sweet spot" where a combination of several factors, including primarily the maximal number of allowed conflicts, the decompressor size, and the resultant number of parent and incremental patterns, leads to a particularly suitable solution in terms of not only compression levels but also toggling rates. In general, designs deploying the control-gater-based approach (e.g. FIG. 4) consume less test data than circuits with the biasing logic of FIG. 3. The latter solution, however, seems to be more aggressive in reducing the switching activity under otherwise similar conditions. With the increasing number of conflicts, a decrease in the number of parent patterns is counterbalanced by the increase in incremental patterns. This trend is mirrored in the resulting compression and toggling rates as the reduced power dissipation is typically achieved at the prize of a lower compression.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. We therefore claim as our invention all that comes within the scope and spirit of these claims.

What is claimed is:

1. A method of low power compression of incompatible test cubes, comprising:
- generating a low toggling parent pattern using a first decompressor unit;
- generating an incremental pattern using a second decompressor unit;
- generating a control pattern using a third decompressor unit;
- generating a test pattern using combination circuitry to combine the low toggling parent pattern and the incremental pattern based on the control pattern; and
- loading the test pattern to a plurality of scan chains,
- wherein the third decompressor unit receives data related to the control pattern from a ring generator in the first decompressor unit.

2. The method recited in claim 1, wherein the third decompressor unit comprises a shadow register, a phase shifter and biasing circuitry.

3. The method recited in claim 1, wherein the third decompressor unit comprises a phase shifter, a control gater and biasing circuitry.

4. The method recited in claim 1, wherein the first decompressor unit comprises one or more shadow registers, each of the one or more shadow registers updating information stored only when input data include information for generating one or more specified bits.

5. The method recited in claim 1, wherein the first decompressor unit comprises the ring generator, two shadow registers and two phase shifters, a first set of outputs of the ring generator serving as inputs for the first shadow register that drives the first phase shifter, a second set of outputs of the ring generator serving as inputs for the second shadow register that drives the second phase shifter.

6. A circuit for decompression, comprising:
- a first decompressor unit for generating low toggling parent patterns;
- a second decompressor unit for generating incremental patterns;
- a third decompressor unit for generating control patterns; and
- combination circuitry for forming test patterns by combining the low toggling parent patterns and the incremental patterns based on the control patterns,
- wherein the third decompressor unit comprises a shadow register, a phase shifter, and biasing circuitry, the shadow register, the phase shifter, and the biasing circuitry being connected in series.

7. The circuit recited in claim 6, wherein the shadow register updates information stored by loading output data from a ring generator in the first decompressor unit according to values generated by parity computing circuitry, the parity computing circuitry computing parities of input data entering the first decompressor unit.

8. The circuit recited in claim 7, wherein the parity computing circuitry is an XOR tree or an XNOR tree.

9. The circuit recited in claim 6, wherein the first decompressor unit comprises one or more shadow registers, each of the one or more shadow registers updating information stored only when input data include information for generating one or more specified bits.

10. The circuit recited in claim 6, wherein the first decompressor unit comprises one or more shadow registers, each of the one or more shadow registers updating information stored according to values generated by corresponding parity computing circuitry.

11. The circuit recited in claim 6, wherein the first decompressor unit comprises a ring generator, two shadow registers and two phase shifters, a first set of outputs of the ring generator serving as inputs for the first shadow register that connects with the first phase shifter, a second set of outputs of the ring generator serving as inputs for the second shadow register that connects with the second phase shifter, the first shadow register being controlled by first parity computing circuitry, the second shadow register being controlled by second parity computing circuitry.

12. A circuit for decompression, comprising:
- a first decompressor unit for generating low toggling parent patterns;
- a second decompressor unit for generating incremental patterns;
- a third decompressor unit for generating control patterns; and
- combination circuitry for forming test patterns by combining the low toggling parent patterns and the incremental patterns based on the control patterns,
- wherein the third decompressor unit comprises a phase shifter, a control gater and biasing circuitry, inputs of the control gater being connected to a first set of outputs of the phase shifter, inputs of the biasing circuitry being connected to an output of the control gater and a second set of outputs of the phase shifter.

* * * * *

UNITED STATES PATENT AND TRADEMARK OFFICE

CERTIFICATE OF CORRECTION

PATENT NO. : 8,832,512 B2
APPLICATION NO. : 13/049829
DATED : September 9, 2014
INVENTOR(S) : Czysz et al.

It is certified that error appears in the above-identified patent and that said Letters Patent is hereby corrected as shown below:

Title Page 2 Item [56]:

Column 2, line 38, "R. Shi" should read --C. Shi--.

In the Specification:

Column 5, lines 38-39, "200 for that works" should read --200 that works--.

Column 7, line 66, "disjoint" should read --disjointed--.

Signed and Sealed this
Twenty-second Day of March, 2016

Michelle K. Lee
*Director of the United States Patent and Trademark Office*